US012475885B2

(12) United States Patent
Shetty

(10) Patent No.: US 12,475,885 B2
(45) Date of Patent: Nov. 18, 2025

(54) TRANSLATION OF VOICE COMMANDS USING MACHINE LEARNING

(71) Applicant: Omnissa, LLC, Mountain View, CA (US)

(72) Inventor: Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 235 days.

(21) Appl. No.: 17/965,958

(22) Filed: Oct. 14, 2022

(65) Prior Publication Data
US 2024/0029729 A1 Jan. 25, 2024

(30) Foreign Application Priority Data
Jul. 20, 2022 (IN) .............................. 202241041635

(51) Int. Cl.
*G10L 15/22* (2006.01)
*G06F 3/16* (2006.01)
*G06F 40/253* (2020.01)
*G06F 40/284* (2020.01)
*G10L 15/26* (2006.01)

(52) U.S. Cl.
CPC ............. *G10L 15/22* (2013.01); *G06F 3/167* (2013.01); *G06F 40/253* (2020.01); *G06F 40/284* (2020.01); *G10L 15/26* (2013.01); *G10L 2015/223* (2013.01)

(58) Field of Classification Search
CPC .......... G10L 15/26; G10L 15/22; G06F 3/167
See application file for complete search history.

(56) References Cited

U.S. PATENT DOCUMENTS

| 7,826,945 | B2* | 11/2010 | Zhang ................... G06F 3/16 715/728 |
| 8,447,602 | B2* | 5/2013 | Bartosik ............... G06F 40/232 704/235 |
| 11,380,304 | B1* | 7/2022 | Ponnusamy ......... G10L 15/1822 |
| 2004/0002994 | A1* | 1/2004 | Brill ..................... G06F 40/232 |
| 2006/0161434 | A1* | 7/2006 | Faisman ................ G10L 15/22 704/E15.04 |
| 2007/0005206 | A1* | 1/2007 | Zhang ................... G10L 15/26 701/1 |
| 2007/0033026 | A1* | 2/2007 | Bartosik ............... G10L 15/26 704/E15.04 |
| 2008/0167871 | A1* | 7/2008 | Kim ..................... G10L 15/22 704/E15.04 |
| 2015/0006170 | A1* | 1/2015 | Caskey ................. G09B 19/06 704/235 |
| 2015/0205779 | A1* | 7/2015 | Bak ..................... G10L 15/01 704/235 |
| 2020/0020319 | A1* | 1/2020 | Malhotra ............... G10L 15/26 |
| 2022/0308718 | A1* | 9/2022 | Klein ................... G10L 15/08 |

* cited by examiner

*Primary Examiner* — Daniel Abebe
(74) *Attorney, Agent, or Firm* — Kim & Stewart LLP

(57) ABSTRACT

The present disclosure relates to translation of voice commands using machine learning. Command text corresponding to a voice command can be received, and at least one error can be identified in the command text. A comparison can be performed between the at least one error and at least one lexical pattern corresponding to a user associated with the voice command. Modified command text can be generated based at least in part on the comparison between the at least one error and the at least one lexical pattern. The modified command text can be determined to fail to comprise an additional error.

17 Claims, 4 Drawing Sheets

TRANSLATION OF VOICE COMMANDS USING MACHINE LEARNING

RELATED APPLICATIONS

Benefit is claimed under 35 U.S.C. 119(a)-(d) to Foreign Application Serial No. 202241041635 filed in India entitled "TRANSLATION OF VOICE COMMANDS USING MACHINE LEARNING", on Jul. 20, 2022, by VMware, Inc., which is herein incorporated in its entirety by reference for all purposes.

BACKGROUND

Voice assistants are increasing in popularity with every passing day. Because voice interaction with voice assistant devices becomes commonplace in work and personal life, the demand for accurate and intuitive voice skills is likewise increasing. This is especially true in enterprise, where such accuracy plays an important role in daily functioning. Inaccurate deciphering of voice commands and other voice interactions can result in not only loss of productivity, but also loss of trust and popularity of voice assistants and may even adversely impact a user.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

The present disclosure relates to translation of voice commands using machine learning. Users may provide voice commands to voice assistants in attempt to invoke voice skills to perform actions or tasks. While inaccurate translation of voice commands is problematic, such translation is often handled by an original equipment manufacturer (OEM) associated with the voice assistant. For that reason, translation of voice commands may occur outside of the purview of the voice skills that those voice commands are intended to invoke. To overcome this issue, various embodiments of the present disclosure use historical data associated with a user to correct erroneous speech recognition of the user's voice commands.

Figure 1:
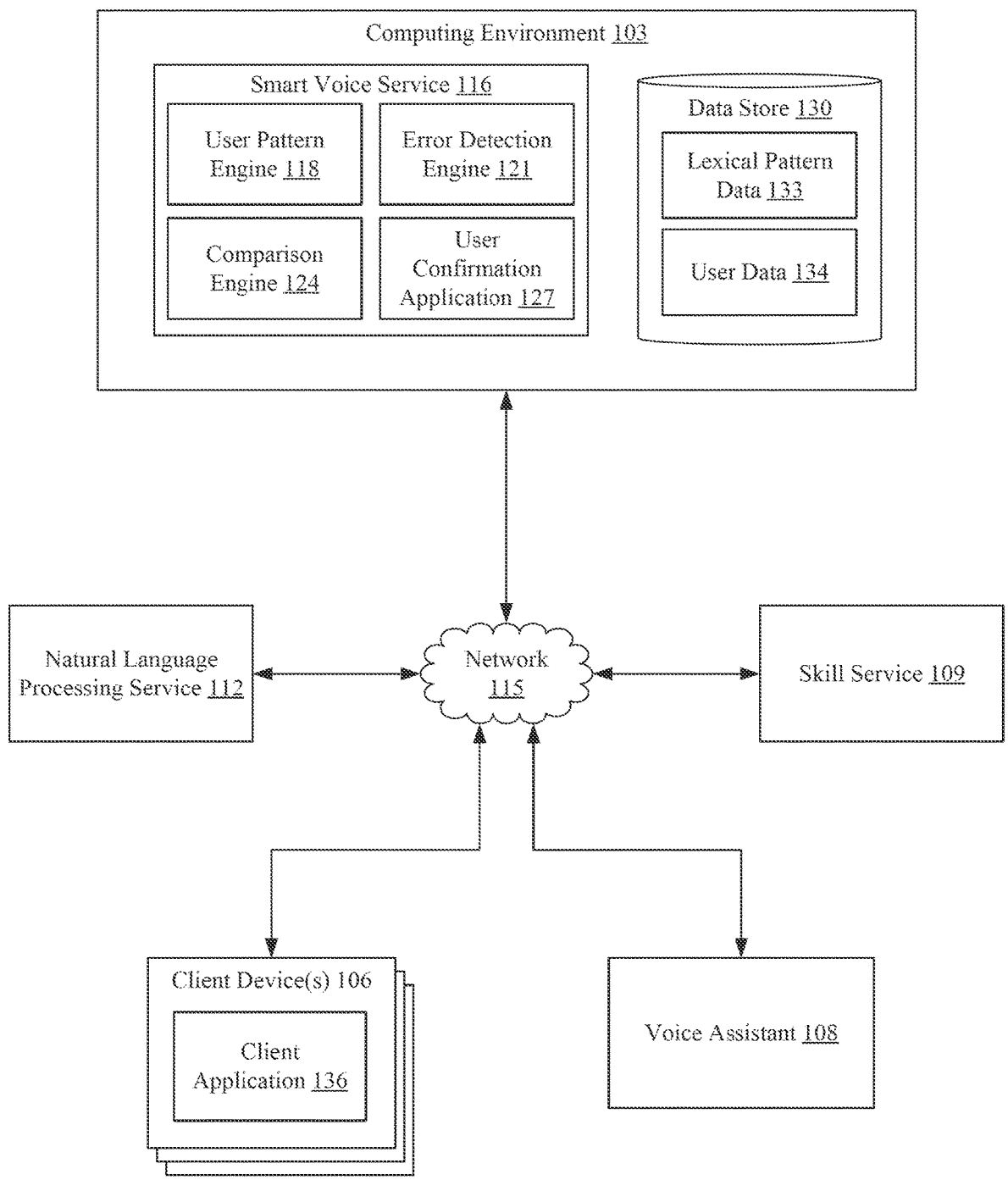
FIG. 1 shows an example of a networked environment, according to various embodiments of the present disclosure.

FIG. 1 shows an example of a networked environment 100 according to various embodiments. The networked environment 100 can include a computing environment 103, one or more client device(s) 106, a voice assistant 108, a skill service 109, and a natural language processing service 112 in communication through a network 115.

The network 115 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 115 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the client devices 106. In that context, the computing environment 103 can execute a smart voice service 116 and potentially other application. The smart voice service 116 can include one or more sub-components, including a user pattern engine 118, an error detection engine 121, a comparison engine 124, and a user confirmation application 127. The computing environment 103 can also include a data store 130.

The data store 130 can include memory of the computing environment 103, mass storage resources of the computing environment 103, or any other storage resources on which data can be stored by the computing environment 103. The data store 130 can include one or more databases, such as a structured query language (SQL) database, a non-SQL database, or other appropriate database. The data stored in the data store 130, for example, can be associated with the operation of the various applications or functional entities described below. The data store 130 can include lexical pattern data 133, user data 134, and potentially other data.

The smart voice service 116 can be executed to modify voice commands provided by a user based on lexical pattern data 133 associated with the user. The smart voice service 116 can receive command text from the skill service 109, where the command text corresponds to a voice command provided by a user. A voice command can comprise a spoken, natural language command to cause the voice assistant to perform some action or task. The smart voice service 116 can generate modified command text based on lexical pattern data 133, which can be confirmed by a user and provided to the skill service 109.

The user pattern engine 118 can be executed to generate lexical pattern data 133 for a user. The user pattern engine 118 can generate lexical pattern data 133 based at least in part on historical data from electronic messages sent and received by a user from user data 134. For example, the user pattern engine 118 can generate the lexical pattern data 133 based on words, phrases, or other grammatical units most frequently used by the user in general or in particular circumstances and the sentiment of the user's messages in general or in particular circumstances. To generate the lexical pattern data 133, the user pattern engine 118 can use techniques such as, for example, term frequency-inverse document frequency (TF-IDF).

In some implementations, the user pattern engine 118 can transform the command text into an embedded representation comprising one or more embeddings. The user pattern engine 118 can train the one or more embeddings jointly with a deep learning model or use pre-trained embeddings. These pre-trained embeddings can include, for example, Word2Vec, GloVe, bidirectional encoder representations from transformers (BERT), or FastText. The user pattern engine 118 can construct a deep learning model—like a convolutional neural network (CNN), recurrent neural network (RNN), or other deep learning model—using embeddings as first layer inputs.

The error detection engine 121 can be executed to detect errors in command text received by the smart voice service 116 from the skill service 109. The error detection engine 121 can parse the command text to detect any words, phrases, or other grammatical units that may be erroneous. That is, the error detection engine 121 can employ grammatical error detection to identify any grammatical units that are ill-formed, ungrammatical, or are otherwise incongruous within the context of the clause(s) and/or sentence(s) comprising the command text. The error detection engine 121 can detect errors within the command text using, for example, a long short-term memory (LSTM) network, an RNN, or a transformer model such as BERT.

If no errors are detected in the command text, the error detection engine 121 can provide the command text to the user confirmation application 127. Otherwise, the error detection engine 121 can provide an indication of any errors detected in the command text to the comparison engine 124. The error detection engine 121 can then receive modified command text from the comparison engine 124. The error detection engine 121 can perform error detection on this modified command text and provide an indication of any errors detected in the modified command text to the comparison engine 124. The error detection engine 121 can continue to perform error detection on the modified command text and providing an indication of any errors detected in the modified command text to the comparison engine 124 until no further errors are detected.

The comparison engine 124 can be executed to compare errors detected in command text (or modified command text, which for simplicity is referred to as "command text" below) associated with a user with lexical pattern data 133 associated with that user. The comparison engine 124 can receive an indication of one or more errors in command text from the error detection engine 122 The comparison engine 124 can compare each erroneous grammatical unit—a morpheme, word, phrase, clause, or sentence—detected in the command text (or modified command text) with the lexical pattern data 133 to identify any grammatical units from the lexical pattern data 133 that match the erroneous grammatical unit. In some implementations, the comparison engine 124 can compare the erroneous grammatical units based on pronunciation rather than syntax.

For each grammatical unit from the lexical pattern data 133 corresponding to an erroneous grammatical unit, the comparison engine 124 can generate a confidence score. The confidence score can comprise a value representing a confidence that the grammatical unit from the lexical pattern data 133 matches the erroneous grammatical unit. For each erroneous grammatical unit, the comparison engine 124 can select a grammatical unit from the lexical pattern data 133 having a highest confidence score. In some implementations, the comparison engine 124 can only select a grammatical unit from the lexical pattern data 133 having a confidence score that meets or exceeds a predefined threshold.

The comparison engine 124 can substitute each selected grammatical unit from the lexical pattern data 133 for the corresponding erroneous grammatical unit within the command text to generate modified command text. The comparison engine 124 can provide the modified command text to the error detection engine 121 so that the error detection engine 121 can detect any further errors within the modified command text. If one or more errors is detected in the modified command text, the comparison engine 124 can receive an indication of the one or more errors from the error detection engine 121. The comparison engine 124 can again compare the one or more errors with the lexical pattern data 133, generate further modified command text, and provide the modified command text to the error detection engine 121. The comparison engine 124 may perform these actions each time an indication of one or more errors in modified command text is received from the error detection engine 121.

The user confirmation application 127 can be executed to cause a user to be notified about any error or errors detected and corrected by the smart voice service 116 within command text corresponding to a voice command provided by the user. In some implementations, the user confirmation application 127 can also provide the user with the confidence score generated by the comparison engine 124.

In some implementations, the user confirmation application 127 can provide the modified command text and an indication of the errors detected in the command text to the voice assistant 108. That way, the voice assistant 108 can communicate the modified command text and/or the detected errors to the user. In other implementations, the user confirmation application 127 can provide the modified command text and the detected errors to the client device 106 to be presented to the user in a display of the client device 106.

The user confirmation application 127 can then receive from the voice assistant 108 or the client device 106 an indication of the user's acceptance or rejection of individual modifications (or one or more of the modifications as a group) from the modified command text. Once all modifications from the modified command text have been accepted or rejected, the user confirmation application 127 can generate finalized command text and provide the finalized command text to the skill service 109. The user confirmation application 127 can generate finalized command text based on the one or more acceptances and/or rejections of modifications from the modified command text. For example, if a modification was accepted, that modification can be included in the finalized command text. As another example, if a modification was rejected, that modification may not be included in the finalized command text and instead reverted to a version from the initial command text.

The lexical pattern data 133 can include historical data regarding the lexical and communicative patterns based on electronic messages sent and received by the user for each user of the client device 106(s). The lexical pattern data 133 can include a user's words phrases used, sentiment of the user's communications in various circumstances, variability of the user's language among different recipients and in different circumstances, and other lexical data. The lexical pattern data 133 for a user can be generated by the user pattern engine 118 based on the user data 134.

The user data 134 can represent historical data regarding user(s) associated with the client device(s) 106. The user pattern engine 118 can generate the lexical pattern data 133 based in the user data 134. The user data 134 can include, for example, information regarding messages sent and received by a user associated with a client device 106.

The client device(s) 106 can be representative of a plurality of client devices 106 that can be coupled to the network 115. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection. The client device 106 can be configured to execute various applications such as a client application 136, a voice assistant 108, and potentially other applications.

The client application 136 can be executed in a client device 106 to access network content served up by the computing environment 103 or other servers or computing devices, thereby rendering a user interface on a display. To this end, the client application 136 can include a browser, a dedicated application, or other executable, and the user interface can include a network page, an application screen, or other user mechanism for obtaining user input. The client device 106 can be configured to execute applications beyond the client application 136 such as email applications, social networking applications, word processors, spreadsheets, or other applications.

In some implementations, the client application 136 can interact with the smart voice service 116 to enable a user to accept or reject modifications made by the smart voice service 116 to command text corresponding to a voice command provided by the user. For example, the client application 136 can present an indication of one or more modifications in a user interface in a display accessible to the client device 106. The client application 136 can enable a user to interact with the user interface to accept or reject one or more modifications. The client application 136 can provide an indication of the user's acceptance or rejection of one or more of the modifications to the smart voice service 116.

The voice assistant 108 can represent a hardware device or a software application configured to perform action(s) and/or task(s) corresponding to one or more voice skills in response to a voice command received from a user. In some implementations, the voice assistant 108 can include a processor-based system, such as a computer system, that can include a voice-activated smart device, a voice assistant, a speaker device, a headphone device or other wearable device, or any other device with a capability to produce and detect sounds. In other implementations, the voice assistant 108 can include an application executed by the client device 106.

The voice assistant 108 can receive a voice command from a user via a microphone or other audio input device. The voice command can comprise a spoken, natural language command that can cause the voice assistant to perform some action or task. The voice assistant 108 can provide audio data corresponding to the voice command to the skill service 109 and receive command text corresponding to the voice command. The voice assistant 108 can interact with the smart voice service 116 to enable a user to accept or reject one or more modifications to the command text made by the smart voice service 116. For example, the voice assistant 108 can output audio corresponding to the one or more modifications and/or the modified command text to the user. The voice assistant 108 can receive audio input from the user accepting or rejecting one or more of the modifications, individually or as a group. The voice assistant 108 can provide an indication of the user's acceptance or rejection of one or more of the modifications to the smart voice service 116.

The skill service 109 can represent one or more cloud-based services that can execute voice commands received from a voice assistant 108. To execute a voice command, the skill service 109 can parse the voice command and perform some action or task specified in the voice command. For example, the skill service 109 can access an application specified by the voice command, compose a message based on the content of the voice command, or provide a response to a query specified in the voice command.

The skill service 109 can receive command text corresponding to a voice command from the natural language processing service 112. The skill service 109 can provide the command text to the smart voice service 116. The skill service 109 can receive modified command text from the smart voice service 116 and execute the modified command text.

The natural language processing service 112 can represent one or more cloud-based services that can provide speech-to-text recognition services to components of the networked environment 100. The natural language processing service 112 can receive audio data corresponding to a voice command from the skill service 109. The natural language processing service 112 can perform speech recognition and speech-to-text translation on the voice command to generate command text. The command text can comprise a textual representation of the voice command. The natural language processing service 112 can provide the command text to the skill service 109.

Figure 2A:
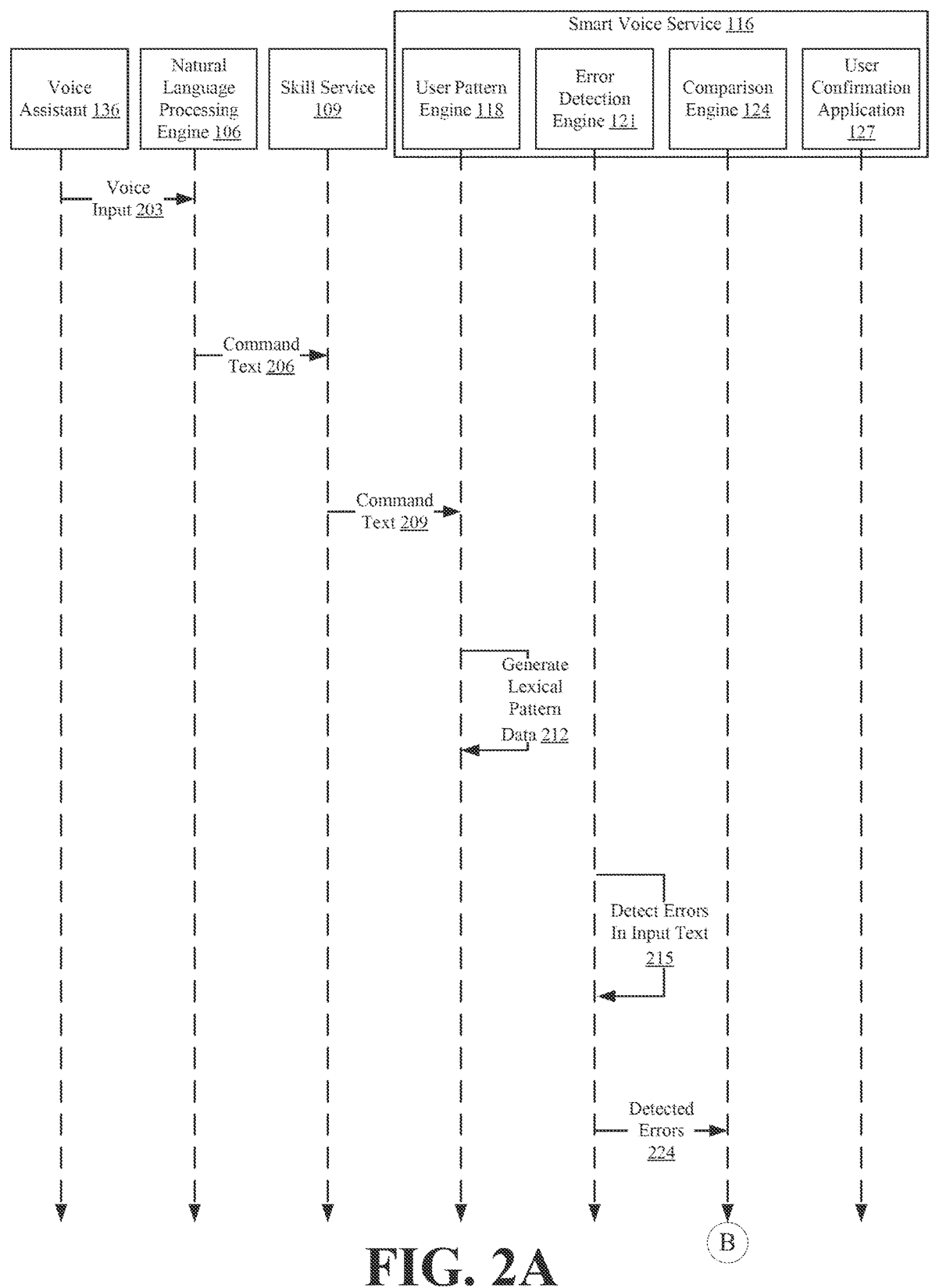
FIGS. 2A-C show sequence diagrams that provide examples of functionality implemented by components of the networked environment 100, according to various embodiments of the present disclosure.

FIG. 2A shows a sequence diagram that provides one example of functionality implemented by components of the networked environment 100. It is understood that the sequence diagram of FIG. 2A provides merely an example of the many different types of functional arrangements that can be employed to implement the portions of the networked environment 100 as described herein. As an alternative, the sequence diagram of FIG. 2A can be viewed as depicting an example of elements of a method implemented within the networked environment 100.

At step 203, the voice assistant 108 can provide audio corresponding to a voice command to the natural language processing service 112. The voice command can comprise a spoken, natural language command that can cause the voice assistant to perform some action or task. The voice command can be spoken by a user in proximity to the voice assistant 108, and the voice assistant 108 can receive the voice command from a user via a microphone or other audio input device.

At step 206, the natural language processing service 112 can provide command text corresponding to the voice command to the skill service 109. The command text can comprise a textual representation of the voice command from step 203. The natural language processing service 112 can perform speech recognition and speech-to-text translation on the voice command to generate command text. At step 209, the skill service 109 can provide the command text to the user pattern engine 118 of the smart voice service 116.

At step 212, the user pattern engine 118 can generate lexical pattern data 133 from the command text. The user pattern engine 118 can generate lexical pattern data 133 based at least in part on historical data in messages sent and received by a user from the user data 134. For example, the user pattern engine 118 can generate the lexical pattern data 133 based on grammatical units most frequently used by the user in general or in particular circumstances and the sentiment of the user's messages in general or in particular circumstances.

At step 215, the error detection engine 121 can detect one or more errors in the command text. The error detection engine 121 can parse the command text to detect any grammatical units that may be erroneous. That is, the error detection engine 121 can employ grammatical error detection to identify any grammatical units that are ill-formed, ungrammatical, or are otherwise incongruous within the context of the clause(s) and/or sentence(s) comprising the command text. At step 218, the error detection engine 121 can provide the one or more errors detected at step 215 to the comparison engine 124. Thereafter, the process can then proceed to FIG. 2B.

Figure 2B:
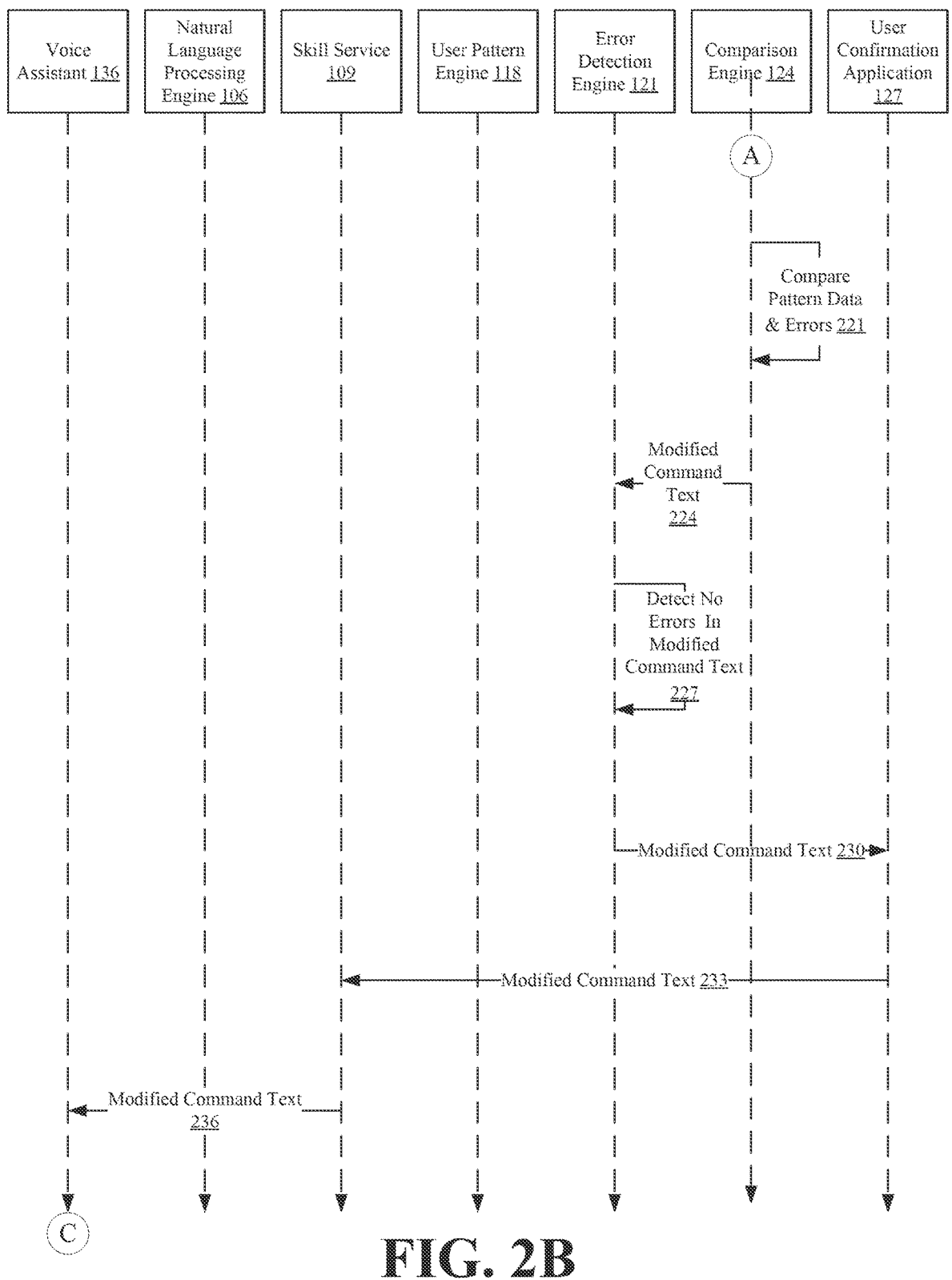

FIG. 2B shows a sequence diagram that provides one example of functionality implemented by components of the networked environment 100. It is understood that the sequence diagram of FIG. 2B provides merely an example of the many different types of functional arrangements that can be employed to implement the portions of the networked environment 100 as described herein. As an alternative, the sequence diagram of FIG. 2B can be viewed as depicting an example of elements of a method implemented within the networked environment 100.

Continuing from FIG. 2A, at step 221, the comparison engine 124 can compare the lexical pattern data 133 generated at step 212 with the one or more errors detected at step 215. The comparison engine 124 can compare each erroneous grammatical unit detected in the command text at step 215 with the lexical pattern data 133 generated at step 212 to identify any grammatical units from the lexical pattern data 133 that match the erroneous grammatical unit.

For each grammatical unit from the lexical pattern data 133 corresponding to an erroneous grammatical unit, the comparison engine 124 can generate a confidence score. The confidence score can comprise a value representing a confidence that the grammatical unit from the lexical pattern data 133 matches the erroneous grammatical unit. For each erroneous grammatical unit, the comparison engine 124 can select a grammatical unit from the lexical pattern data 133 having a highest confidence score. In some implementations, the comparison engine 124 can only select a grammatical unit from the lexical pattern data 133 having a confidence score that meets or exceeds a predefined threshold.

At step 224, the comparison engine 124 can provide modified command text to the error detection engine 121. The comparison engine 124 can substitute each grammatical unit from the lexical pattern data 133 selected at step 221 for the corresponding erroneous grammatical unit within the command text to generate modified command text. The comparison engine 124 can provide the modified command text to the error detection engine 121 so that the error detection engine 121 can detect any further errors within the modified command text.

At step 227, the error detection engine 121 can detect that there are no further errors in the modified command text. The error detection engine 121 can employ grammatical error detection to determine that the modified command text does not include any grammatical units that are ill-formed, ungrammatical, or are otherwise incongruous within the context of the clause(s) and/or sentence(s) comprising the modified command text. At step 230, the error detection engine 121 can provide modified command text to the user confirmation application 127. At step 233, the user confirmation application 127 can provide the modified command text (and an indication of the errors detected in the command text) to the voice assistant 108.

At step 236, the voice assistant 109 can enable a user to accept or reject one or more modifications to the command text made by the comparison engine 124. For example, the voice assistant 108 can output audio corresponding to the one or more modifications and/or the modified command text to the user. Thereafter, the process can proceed to FIG. 2C.

Figure 2C:
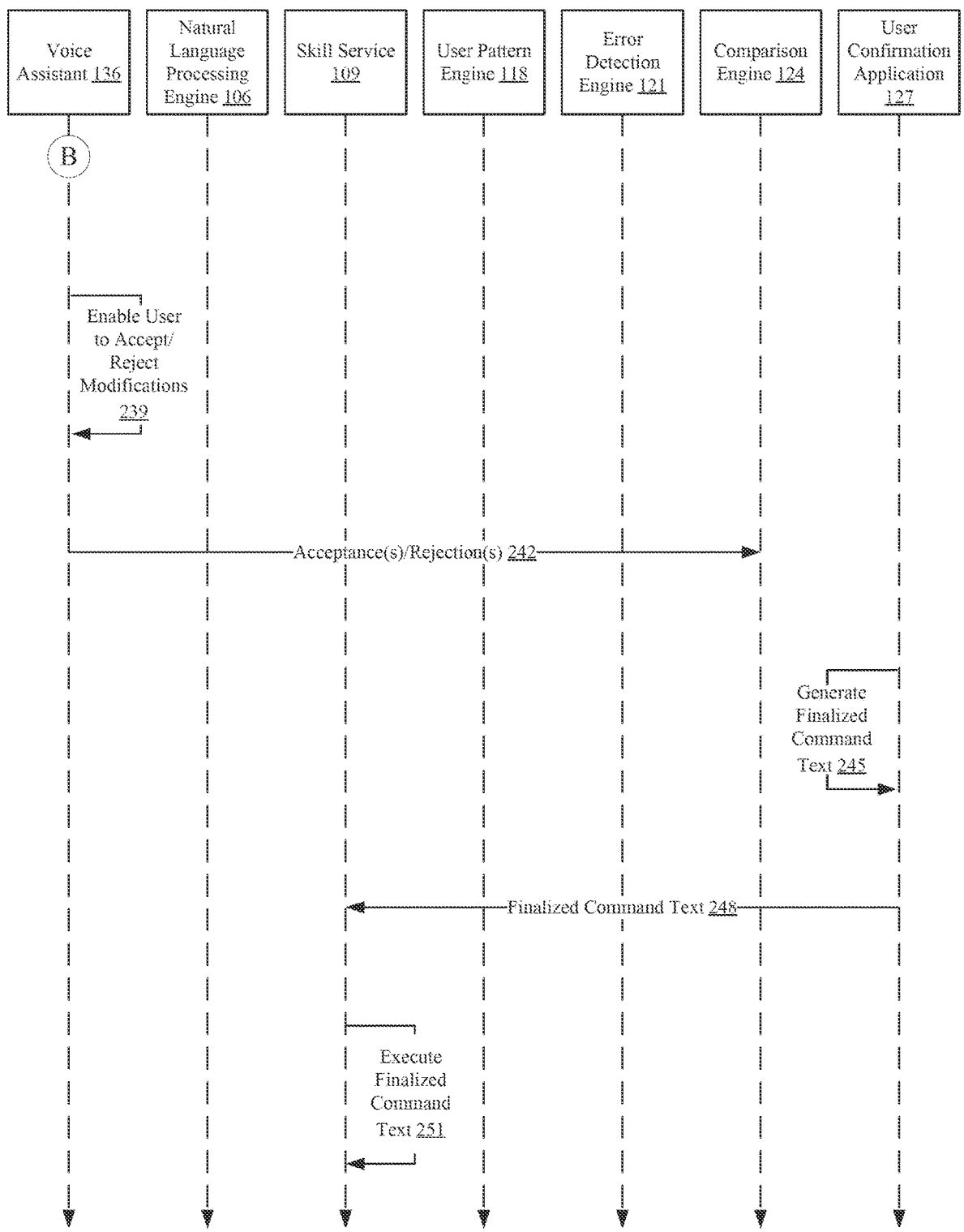

FIG. 2C shows a sequence diagram that provides one example of functionality implemented by components of the networked environment 100. It is understood that the sequence diagram of FIG. 2C provides merely an example of the many different types of functional arrangements that can be employed to implement the portions of the networked environment 100 as described herein. As an alternative, the sequence diagram of FIG. 2C can be viewed as depicting an example of elements of a method implemented within the networked environment 100.

Continuing from FIG. 2B, at step 239, the voice assistant 108 can receive and acceptance or a rejection of each of the modifications from the modified command text. For example, the voice assistant 108 can receive audio input from the user accepting or rejecting one or more of the modifications, individually or as a group.

At step 242, the voice assistant 108 can provide an indication of one or more acceptances and/or rejections of modifications from the modified command text to the user confirmation application 127. At step 245, the user confirmation application 127 can generate finalized command text based on the one or more acceptances and/or rejections of modifications from the modified command text. For example, if a modification was accepted, that modification can be included in the finalized command text. As another example, if a modification was rejected, a grammatical unit corresponding to the modification from the initial command text can be included in the finalized command text.

At step 248, the user confirmation application 127 can provide finalized command text to the skill service 109. At step 251, the skill service 109 can execute a voice command corresponding to the finalized command text. The skill service 109 can parse the modified command text and perform some action or task specified by the finalized command text. Thereafter, the process can proceed to completion.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A system, comprising:
   at least one computing device comprising a processor and a memory; and
   machine-readable instructions stored in the memory that, when executed by the processor, cause the at least one computing device to at least:
   receive command text corresponding to a voice command;
   identify at least one error in the command text, the error comprising one or more words, phrases or grammatical units that are determined to be erroneous;
   determine at least one lexical pattern corresponding to a user associated with the voice command based at least in part on at least one electronic message associated with the user;
   perform a comparison between the at least one error and the at least one lexical pattern corresponding to the user associated with the voice command;
   generate modified command text based at least in part on the comparison between the at least one error and the at least one lexical pattern; and
   determine that the modified command text does not comprise any error.

2. The system of claim 1, wherein the machine-readable instructions that cause the at least one computing device to at least generate the modified command text based at least in part on the comparison between the at least one error and the at least one lexical pattern further cause the at least one computing device to at least substitute a grammatical unit corresponding to the at least one error for a grammatical unit corresponding to the at least one lexical pattern within the command text.

3. The system of claim 1, wherein the at least one computing device is at least one first computing device, and the machine-readable instructions further cause the at least one computing device to at least:
   provide the modified command text to at least one second computing device;
   receive from the at least one second computing device an indication of at least one acceptance of at least one modification of the modified command text;
   generate a finalized command text based at least in part on the at least one acceptance and the modified command text; and
   provide the finalized command text to at least one third computing device.

4. The system of claim 3, wherein the at least one second computing device comprises a voice assistant device, and the voice command is associated with the voice assistant device.

5. The system of claim 3, wherein the at least one third computing device comprises a voice skill service corresponding to an application associated with the voice command, and the command text is received from the voice skill service.

6. The system of claim 1, wherein the at least one lexical pattern corresponding to the user comprises a grammatical unit from the at least one electronic message, and the at least one lexical pattern corresponding to the user is determined based at least in part on a frequency that the grammatical unit occurs within the at least one electronic message.

7. A method, comprising:
   receiving command text corresponding to a voice command;
   identifying at least one error in the command text, the error comprising one or more words, phrases or grammatical units that are determined to be erroneous;
   determining at least one lexical pattern corresponding to a user associated with the voice command based at least in part on at least one electronic message associated with the user;
   performing a comparison between the at least one error and the at least one lexical pattern corresponding to the user associated with the voice command;
   generating modified command text based at least in part on the comparison between the at least one error and the at least one lexical pattern; and
   determining that the modified command text does not comprise any error.

8. The method of claim 7, wherein generating the modified command text based at least in part on the comparison between the at least one error and the at least one lexical pattern further comprises substituting a grammatical unit corresponding to the at least one error for a grammatical unit corresponding to the at least one lexical pattern within the command text.

9. The method of claim 7, further comprising:
   providing the modified command text to a voice assistant device;
   receiving from the voice assistant device an indication of at least one acceptance of at least one modification of the modified command text;
   generating a finalized command text based at least in part on the at least one acceptance and the modified command text; and
   providing the finalized command text to at least one third computing device.

10. The method of claim 9, wherein the voice command is associated with the voice assistant device.

11. The method of claim 9, wherein the at least one third computing device comprises a voice skill service corresponding to an application associated with the voice command, and the command text is received from the voice skill service.

12. The method of claim 7, wherein the at least one lexical pattern corresponding to the user comprises a grammatical unit from the at least one electronic message, and the at least one lexical pattern corresponding to the user is determined based at least in part on a frequency that the grammatical unit occurs within the at least one electronic message.

13. A non-transitory computer-readable medium comprising executable instructions, wherein the instructions, when executed by at least one processor, cause at least one computing device to at least:
- receive command text corresponding to a voice command;
- identify at least one error in the command text, the error comprising one or more words, phrases or grammatical units that are determined to be erroneous;
- determine at least one lexical pattern corresponding to a user associated with the voice command based at least in part on at least one electronic message associated with the user;
- perform a comparison between the at least one error and the at least one lexical pattern corresponding to the user associated with the voice command;
- generate modified command text based at least in part on the comparison between the at least one error and the at least one lexical pattern; and
- determine that the modified command text does not comprise any error.

14. The non-transitory computer-readable medium of claim 13, wherein the executable instructions that cause the at least one computing device to at least generate the modified command text based at least in part on the comparison between the at least one error and the at least one lexical pattern further cause the at least one computing device to at least substitute a grammatical unit corresponding to the at least one error for a grammatical unit corresponding to the at least one lexical pattern within the command text.

15. The non-transitory computer-readable medium of claim 13, wherein the at least one computing device is at least one first computing device, and the machine-readable instructions further cause the at least one computing device to at least:
- provide the modified command text to at least one second computing device;
- receive from the at least one second computing device an indication of at least one acceptance of at least one modification of the modified command text;
- generate a finalized command text based at least in part on the at least one acceptance and the modified command text; and
- provide the finalized command text to at least one third computing device.

16. The non-transitory computer-readable medium of claim 15, wherein
- the at least one second computing device comprises a voice assistant device, and the voice command is associated with the voice assistant device, and
- the at least one third computing device comprises a voice skill service corresponding to an application associated with the voice command, and the command text is received from the voice skill service.

17. The non-transitory computer-readable medium of claim 13, wherein the at least one lexical pattern corresponding to the user comprises a grammatical unit from the at least one electronic message, and the at least one lexical pattern corresponding to the user is determined based at least in part on a frequency that the grammatical unit occurs within the at least one electronic message.

* * * * *